United States Patent
Harklau

[19]
[11] 3,923,403
[45] Dec. 2, 1975

[54] CIRCUIT FOR LIGHT MEASURING DEVICES AND METHOD

[75] Inventor: Lanny L. Harklau, Minneapolis, Minn.

[73] Assignee: Minnesota Mining and Manufacturing Company, St. Paul, Minn.

[22] Filed: Aug. 22, 1974

[21] Appl. No.: 499,507

[52] U.S. Cl. ................ 356/201; 250/559; 324/98; 356/179; 356/202; 356/205; 356/226
[51] Int. Cl.² ...................... G01M 21/22; G01J 1/44
[58] Field of Search .......... 356/179, 180, 184, 201, 356/202, 203, 205, 226, 229; 250/559, 565

[56] References Cited
UNITED STATES PATENTS
3,542,479  11/1970  Sibalis ............................ 356/201
3,771,877  11/1973  Rosencranz ..................... 356/201

*Primary Examiner*—Vincent P. McGraw
*Attorney, Agent, or Firm*—Alexander, Sell, Steldt & DeLaHunt

[57] ABSTRACT

Circuit and method of use thereof in light measuring devices and, particularly, devices for measuring optical density and the calibration of neutral density filters. The basic circuit includes a phase-inverting operational amplifier with a first current determining means connected to one input of the amplifier and a second current determining means including a photomultiplier tube connected between the output of the amplifier and the one input as a feedback circuit. Optical density measurements are made by directing a constant light level to the photomultiplier tube. A variable circuit parameter(s) in one of the two current determining means is used to keep the cathode voltage of the photomultiplier at the same level for two conditions, i.e., when a specimen is in the light path and when the specimen is not in the light path. The magnitudes of such circuit parameter(s) for the two conditions are used to calculate the optical density of the specimen.

19 Claims, 3 Drawing Figures

CIRCUIT FOR LIGHT MEASURING DEVICES AND METHOD

BACKGROUND OF THE INVENTION

1. Field of the Invention:

This invention relates to circuitry and method of use thereof in light measuring devices and, particularly, devices for making optical density measurements and the calibration of neutral density filters.

2. Description of the Prior Art:

Optical density is a function of the fraction of light which is transmitted and more specifically is equal to the logarithm of the reciprocal of the transmissivity. In the prior art instruments, such as a densitometer, known neutral density filters calibrated by a standards laboratory such as the U.S. National Bureau of Standards, may be used to calibrate the instrument. The calibration of the neutral density filters is limited in accuracy to about 0.01 optical density or 3 percent of the optical density which ever is greater. Further, the method used by the Bureau of Standards laboratory for calibrating neutral density filters limits the range over which neutral density filters can be calibrated placing a limit on the range of optical density measurements that can be made with an instrument.

SUMMARY OF THE INVENTION

The disclosed circuit and the method for using it does not require the use of calibrated neutral density filters and can be used for calibrating neutral density filters with an accuracy permitting their use as standards. The method can also be used to determine light losses or increases in photometric devices such as densitometers, spectrophotometers, fluorimeters, etc. The basic circuit of the invention includes a phase-inverting operational amplifier having a first current determining means connected to one input of the amplifier, and a second current determining means, including a photomultiplier tube, connected between the output and the one input of the amplifier as a feedback circuit. Provision is made to enable the user to vary a circuit parameter(s) in one of the two current determining means to establish the cathode voltage of the photomultiplier tube to which a constant light source is directed.

Optical density measurements are made with the constant light source directed toward the photomultiplier tube. The variable circuit parameter(s) of the selected current determining means is adjusted to establish the same level for the cathode voltage of the photomultiplier tube when the specimen, a filter for example, is present in the light path and when the specimen is not in the light path. The magnitude of the adjusted circuit parameter(s) presented for each condition is determined and used to calculate the optical density of the specimen.

One or more operational amplifiers may be included in the second current determining means to enhance the accuracy with which optical density determinations of a specimen can be made. With this arrangement a change in a circuit parameter(s) of the second current determining means causes the gain of at least one of the operational amplifiers of the second current determining means to be altered which is reflected in a change of cathode voltage of the photomultiplier making it possible to adjust the cathode voltage so it is the same for the two measuring conditions. The values of the parameter(s) used to establish the cathode voltage at a desired level are determined for each condition and are used to calculate the optical density of the specimen. Further, a single variable resistance may be connected in series with the photomultiplier tube in the second current determining means and varied to establish the cathode voltage as required for the two measuring conditions.

Since voltage and resistance measurements can be measured with a higher degree of accuracy than is possible with respect to the accuracy of calibration of neutral density filters, as accomplished heretofore, this invention makes it possible to obtain more accurate determinations of optical density.

This method of determining optical density also allows the circuit to be used to calibrate neutral density filters with a degree of accuracy that permits such filters to be used as standards. In addition, neutral density filters calibrated using the circuit of this invention can be used to extend the range of optical density measurements that is possible with a given circuit utilizing only variations in the circuit parameter(s). A neutral density filter of a known optical density, as determined using the circuit, can be placed in the light path to provide an optical density reference which with the cathode voltage, controlling circuit parameter(s) is used to extend the range of optical density that can be measured beyond that which is possible using only the controlling circuit parameter(s) of the current determining means of the circuit. Such a method enables optical density determinations to be made which heretofore were not possible.

BRIEF DESCRIPTION OF THE DRAWINGS

A detailed description of the invention follows which is set forth in conjunction with the accompanying drawings, wherein.

DETAILED DESCRIPTION

Figure 1:
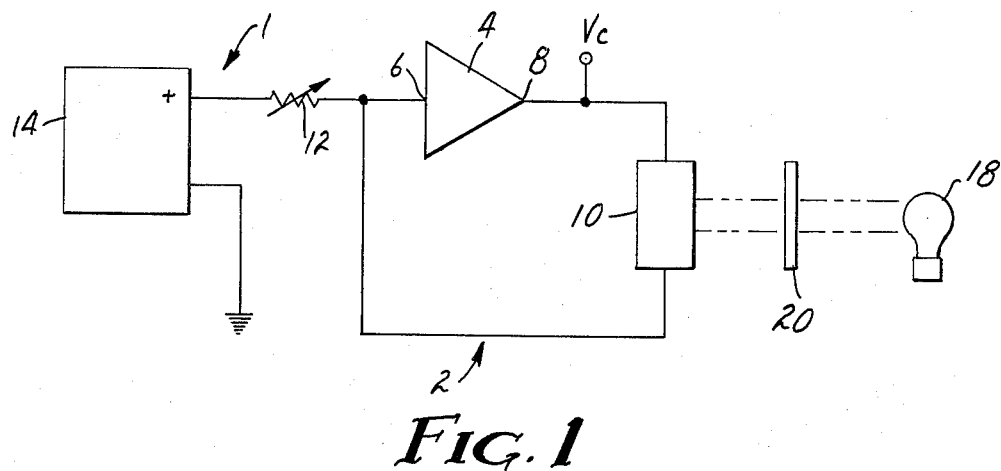
FIG. 1 is a schematic of a circuit shown used in a densitometer.
Figure 2:
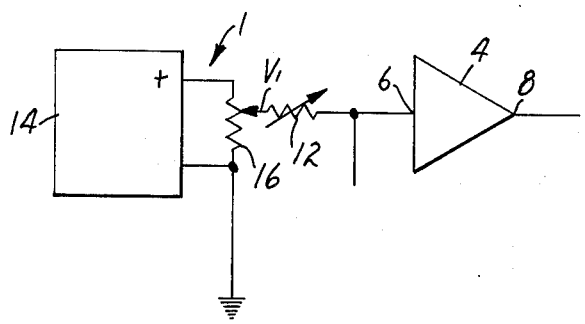
FIG. 2 is a partial showing of the circuit of FIG. 1 including some modification.

The circuit shown in FIG. 1 includes an operational amplifier 4 of the phase inverting type with a first current determining means 1 connected to one input 6 of the amplifier and a second current determining means 2 connected between the output 8 and input 6 as a feedback circuit which includes a photomultiplier 10. With respect to any operational amplifier described herein, only those connections as are needed for an understanding of the invention are mentioned. Other connections, such as power connections, required for the amplifier are known to those familiar with operational amplifiers. Since an operational amplifier is a very high gain amplifier, the sum of the currents from the two current determining means 1 and 2 at the input 6 of amplifier 4 is very close to zero. Accordingly, the operation of the circuit is such that a current flow established by the first current determining means 1 is matched with a current supplied by the second current determining means which is of the same magnitude, but of opposite phase. The first current determining means 1 may include a resistive circuit portion 12 connected between the input 6 and a d.c. voltage supply 14. This arrangement for the first current determining means 1 provides a current equal to the voltage $V_1$ from supply 14 divided by the resistance presented by the resistive portion 12. Accordingly, the voltage $V_1$ and/or the resistance of the resistive portion 12 may be varied to change the current level provided by the first current determining means 1. The resistive portion 12 is, therefore, represented in FIG. 1 as a variable resistance which in actual practice, for example, may be a potentiometer or a number of fixed known resistors selectively connected to a potentiometer which is varied for any fine adjustment that may be needed. The DC voltage supply 14, for example, may be made adjustable by connecting a potentiometer 16 as a part of the supply 14 as shown in FIG. 2 with the movable contact of the potentiometer 16 connected to the resistive portion 12. The voltage $V_1$ is then the voltage which appears between the movable contact and ground.

The circuit described can be used in a densitometer for measuring optical density without the use of any calibrated neutral density filters. The circuit is, therefore, shown in FIG. 1 for use in a densitometer wherein a constant level light source 18 is provided which is directed toward the photomultiplier tube 10 with provision made for positioning a specimen 20 in the light path.

Figure 3:
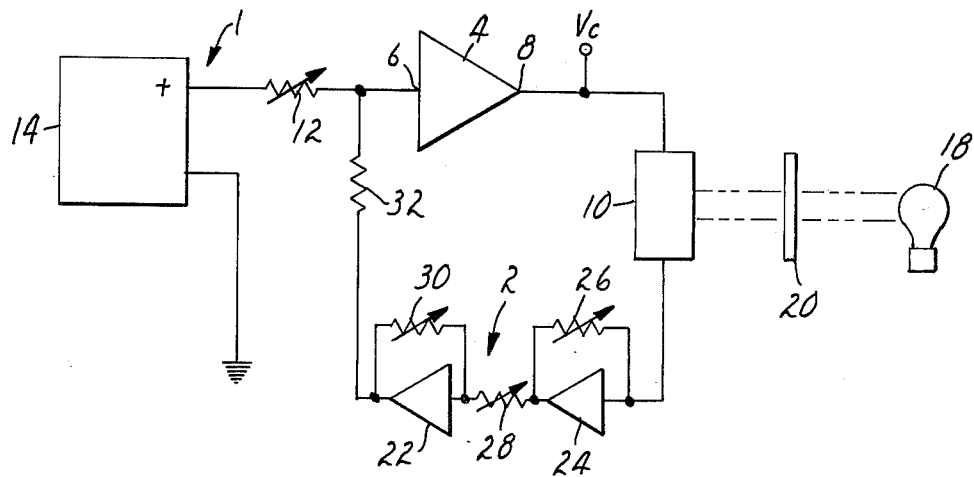
FIG. 3 is a schematic of circuit which is similar to the circuit of FIG. 1 and shown used in a densitometer.

FIG. 3 is similar to the circuit of FIG. 1. The same reference numerals used in FIG. 1 identify like elements in the circuit of FIG. 3. The circuit of FIG. 3 differs from that of FIG. 1 in that the second current determining means 2 includes two operational amplifiers 22 and 24, the addition of which makes optical density determinations obtained using the circuit of FIG. 3 more accurate than those made using the circuit of FIG. 1. The operational amplifier 24 is connected as a current amplifier and has its input connected to the anode of the photomultiplier tube 10. A feedback resistor 26, which may be variable, is connected between the output and input of amplifier 24. Operational amplifier 22 is connected as a voltage amplifier and, therefore, has its input connected to the output of operational amplifier 24 via a resistor 28, which may be variable. Amplifier 22 also has a feedback resistor 30, which may be variable, connected between its output and input. The output of operational amplifier 22 is connected to the input 6 of operational amplifier 4 via a resistor 32.

It is possible to use only one of the operational amplifiers 22 and 24 in the feedback circuit of FIG. 3. It is then necessary, however, that the amplifier be a non-phase inverting type since amplifier 4 has been described as a phase inverting type, the current fed back to the input 6 of operational amplifier 2 must be opposite in sign to the input current provided by the resistive portion 12 and the voltage from the voltage supply 14. Of course, if amplifier 4 is a non-inverting type, then a single amplifier in the feedback circuit must be a phase inverting type.

Operation of the circuits for making optical density measurements of a specimen 20 will now be described. At least one circuit parameter in the two current determining means 1 and 2 is selected which when varied causes a change in the cathode voltage, $V_c$, of the photomultiplier tube 10. In the circuits shown, the cathode voltage $V_c$ is the voltage at the output of operational amplifier 4. In the case of the circuits of FIGS. 1, 2 and 3, the resistive circuit portion 12 and/or the voltage $V_1$ provided to the portion 12 may be used as the variable circuit parameter(s). The current provided by each of the current determining means 1 and 2 is thereby established with such changes reflected in the cathode voltage of tube 10. Two conditions are established for which the magnitudes of the circuit parameter(s) to be varied are determined. One condition requires the specimen 20 to be examined to be placed in the light path between the light source 18 and the photomultiplier tube 10. The magnitude of the circuit parameter(s) to be varied are determined and the voltage $V_c$ for the cathode of the photomultiplier tube 10 measured. The other condition is that presented with the specimen 20 removed from the light path and the circuit parameter(s) varied so the cathode voltage $V_c$ is the same as that presented for the first condition. The magnitudes of the varied parameter(s) for this condition are determined.

It has been discovered that the optical density can be determined from the two conditions mentioned using the relationship of the current or the current affecting parameter(s) for the one of the current determining means 1 and 2 which is varied for the two conditions wherein $V_c$ is made the same for each condition. Thus, the optical density (O.D.) can be determined from the basic equation set forth below wherein $I_w$ is the current for the current determining means 1 or 2 for the measured condition when the specimen is in place in the light path and $I_{wo}$ is such current with the specimen out of the light path:

$$\text{O.D. (specimen)} = \log_{10} \frac{I_{wo}}{I_w} \qquad (1)$$

If $R_{12}$ and $V_1$ are varied and with the w and wo subscripts as used in equation (1) to designate the two measuring conditions, equation (1) can be rewritten in the following form:

$$\text{O.D.} = \log_{10} \frac{R_{12w}}{V_{1w}} \frac{V_{1wo}}{R_{12wo}} \qquad (2)$$

Similarly, if $R_{12}$ is varied and $V_1$ remains unchanged, equation (1) can be rewritten in the following form:

$$\text{O.D.} = \log_{10} \frac{R_{12w}}{R_{12wo}} \qquad (3)$$

In addition to determining the optical density of a specimen 20 in the manner described above, the circuit shown in FIG. 3 can be used to make such a determination by varying any number of the resistances 26, 28 and 30 in the second current determining means 2 to control the cathode voltage $V_c$. The values of such resistances which are varied are determined for the condition when the specimen 20 to be measured is positioned in the light path and when the specimen 20 is not in the light path. As before, the cathode voltage $V_c$ is required to be the same for each of the measuring conditions. In this case, the optical density can be determined using the following equation:

$$\text{O.D.} = \log_{10} \frac{R_{28wo}}{R_{28w}} \frac{R_{26w}}{R_{26wo}} \frac{R_{30w}}{R_{30wo}} \qquad (4)$$

where the subscripts "w" and "wo" indicate values of the resistances with and without the specimen 20 in the light path, respectively. Of course, if some of the resistances in equation (4) are not altered to obtain the measuring condition, such resistances cancel out in the above equation. Accordingly, it can be seen that the variable resistance 28 can be connected in series with the photomultiplier tube 10 without using operational amplifiers 22 and 24 with their feedback resistors 30 and 26, respectively. Further, as indicated earlier, only one of the operational amplifiers may be used with its associated resistors and the equation (4) modified accordingly by cancellation of the resistors not used in the circuit.

The method for making optical density measurements as described above enables one to use a known neutral density filter to extend the range of optical density measurements beyond that which is possible without the use of a known neutral density filter. Further, the known neutral density filter may be one that was determined using the circuit that has been described. The method described earlier required a measurement when a specimen was not presented in the light path. The use of a calibrated neutral density filter merely changes the measuring reference from a level of full transmissivity to one of a known transmissivity. The method remains the same except that a known neutral density filter is used in the light path for each measuring condition. Thus, the controlling parameter(s) is determined when the calibrated neutral density filter and the specimen to be measured in the light path and when only the calibrated filter is in the light path with the controlling parameter(s) varied so the cathode voltage $V_c$ is the same for each condition. The optical density of the specimen being measured is the optical density calculated using the applicable one of the equations set forth earlier plus the optical density of the known neutral density filter. This method of determining optical density reduces the range of variability for the circuit parameter(s) which would otherwise be required if the optical density of a specimen were to be determined solely from the magnitude of the varied circuit parameter(s) or as mentioned above it extends the range of use of a circuit of the type described which may have been designed to provide for limited range of optical density measurements. The extension in this manner of the range of optical density measurements using a circuit of the type shown in FIGS. 1 and 3 makes it possible for optical density measurements to be made which heretofore were not possible. Light losses or increases over seven orders of magnitude can be determined.

In light of the above teachings, alternative arrangements and techniques embodying the invention will be suggested to those skilled in the art. The scope of protection afforded the invention is not intended to be limited to the specific embodiments disclosed, but is to be determined only in accordance with the appended claims.

What we claim is:

1. A method for determining the optical density of a specimen including the steps of
    1. providing a constant level light source, an operational amplifier having an output and at least one input, a first current determining means connected to said one input, a second current determining means connected between said output and said one input as a feedback circuit, said second current determining means including a photomultiplier tube positioned to receive the light from said light source;
    2. adjusting at least one circuit parameter of one of said current determining means so the cathode voltage of said photomultiplier tube is the same for two conditions, a first condition wherein the specimen is in the light path between said light source and said photomultiplier tube and second condition wherein the specimen is not in said light path; and
    3. using the magnitude of the adjusted circuit parameters of said one current determining means for said first and second condition in step (2) to calculate the optical density of said specimen.

2. A method of determining the optical density of a specimen in accordance with claim 1 wherein said one of said current determining means is said first current determining means and the calculation of the optical density in accordance with step (3) utilizes the following relationship:

$$\text{Optical Density} = \text{logarithm}_{10} \frac{I_{wo}}{I_w},$$

where $I_{wo}$ and $I_w$ are the currents supplied in step (2) to said one input by said first current determining means when the specimen is not in said light path and when the specimen is in said light path, respectively.

3. A method for determining the optical density of a specimen in accordance with claim 2 wherein said first current determining means includes a voltage source and a resistive portion connecting said voltage source to said one input, the magnitude of the voltage provided by said voltage source being directly related to the current supplied to said one input and the magnitude of said resistive portion being inversely related to the current supplied to said one input.

4. A method for determining the optical density of a specimen in accordance with claim 3 wherein said circuit parameter adjusted in step (2) is said voltage source.

5. A method for determining the optical density of a specimen in accordance with claim 3 wherein the circuit parameter adjusted in step (2) is said resistive portion.

6. A method for determining the optical density of a specimen in accordance with claim 1 wherein the second current determining means provided in step (1) includes a circuit portion connected in series with said photomultiplier tube, said circuit portion having at least one circuit parameter for adjustment in accordance with step (2).

7. A method for determining the optical density of a specimen in accordance with claim 6 wherein said circuit portion includes at least one operational amplifier having a first resistive element connected to an input of said one operational amplifier and a second resistive element connected between the output and said input of said one operational amplifier, at least one of said first and second resistance elements being variable for adjusting in step (2) and the calculation of the optical density in accordance with step (3) utilizes the following relationship:

$$\text{Optical Density} = \text{logarithm}_{10} \frac{R_{1wo} \ R_{2w}}{R_{1w} \ R_{2wo}}$$

where $R_{1w}$ and $R_{2w}$ are the values in step (2) of the resistance presented by said first and second resistive elements, respectively, when the specimen is in said light path and $R_{1wo}$ and $R_{2wo}$ are the values in step (2) of the resistance presented by said first and second resistive elements, respectively, when the specimen is not in said light path.

8. A method for determining the optical density of a specimen in accordance with claim 6 wherein said circuit portion includes at least one operational amplifier having a variable resistive element connected to an input of said one operational amplifier for adjusting in step (2) and the calculation of the optical density in accordance with step (3) utilizes the following relationship:

$$\text{Optical Density} = \text{logarithm}_{10} \frac{R_{wo}}{R_w},$$

where $R_w$ is the value in step (2) of the resistance presented by said variable resistance, element when the specimen is in said light path and $R_{wo}$ is the value in step (2) of the resistance presented by said variable resistance element when the specimen is not in said light path.

9. A method for determining the optical density of a specimen in accordance with claim 6 wherein said circuit portion includes at least one operational amplifier having a variable resistive element connected between the output and said input of said one operational amplifier for adjusting in step (2) and the calculation of the optical density in accordance with step (3) utilizes the following relationship:

$$\text{Optical Density} = \text{logarithm}_{10} \frac{R_w}{R_{wo}},$$

where $R_w$ is the value in step (2) of the resistance presented, by said resistive element when the specimen is in said light path and $R_{wo}$ is the value in step (2) of the resistance presented by said variable resistive element when the specimen is not in said light path.

10. A method for determining the optical density of a specimen in accordance with claim 6 wherein said circuit portion includes a variable resistive element connected series relation with said photomultiplier tube for adjusting in step (2) and the calculation of the optical density in accordance with step (3) utilizes the following relationship:

$$\text{Optical density} = \text{logarithm}_{10} \frac{R_{wo}}{R_w},$$

where $R_w$ is the value in step (2) of the resistance presented by said variable resistive element when the specimen is in said light path and $R_{wo}$ is the value in step (2) of the resistance presented by said variable resistive element when the specimen is not in said light path.

11. A method for determining the optical density of a specimen in accordance with claim 6 wherein said circuit portion includes two series connected operational amplifiers, one of said two operational amplifiers including a first resistive element connected to an input of said one operational amplifier with a second resistive element connected between said input and the output of said one operational amplifier, the other of said two operational amplifiers having a third resistive element connected between an input and the output of said other operational amplifier, at least one of said first, second and third resistive elements being variable for adjusting in step (2) and the calculation of the optical density in accordance with step (3) utilizes the following relationship:

$$\text{Optical Density} = \text{logarithm}_{10} \frac{R_{1wo}}{R_{1w}} \frac{R_{2w}}{R_{2wo}} \frac{R_{3w}}{R_{3wo}},$$

where $R_{1w}$, $R_{2w}$, $R_{3w}$ are the values of the resistance presented by said first, second and third resistive elements, respectively, when the specimen is in said light path and $R_{1wo}$, $R_{2wo}$, $R_{3wo}$ are the values in step (2) of the resistance presented by said first, second and third resistive elements, respectively, when the specimen is not in said light path.

12. A circuit for use in a densitometer having a constant light source directed toward a photomultiplier tube with provision made to dispose a specimen to be examined in the light path between the light source and the photomultiplier tube, said circuit comprising an operational amplifier having an output and at least one input, a first current determining means connected to said one input, a second current determining means connected between said output and said one input as a feedback circuit, said second current determining means including said photomultiplier, one of said first and second current determining means having at least one variable circuit parameter, other than said photomultiplier tube, which when varied changes the cathode voltage of said photomultiplier tube.

13. A circuit in accordance with claim 12 wherein said first current determining means includes a variable resistive portion for connection to a voltage source for providing said one circuit parameter.

14. A circuit in accordance with claim 12 wherein said first current determining means includes a variable voltage source for providing said one variable circuit parameter.

15. A circuit in accordance with claim 12 wherein said first current determining means includes a variable resistive portion and a variable voltage source for providing said one variable circuit parameter.

16. A circuit in accordance with claim 12 wherein said second current determining means includes at least one operational amplifier connected in series with said photomultiplier tube having a variable resistive element connected between the output and one input of said one operational amplifier for providing said one variable circuit parameter.

17. A circuit in accordance with claim 12 wherein said second current determining means includes at least one operational amplifier connected in series with said photomultiplier tube having a first resistive element connected to an input of said one operational amplifier and a second resistive element connected between the output and said input of said one operational amplifier at least one of said first and second resistive element being variable for providing said one circuit parameter.

18. A circuit in accordance with claim 12 wherein said second current determining means includes two operational amplifiers connected in series with said photomultiplier tube, one of said two operational amplifiers including a first resistive element connected to an input of said one operational amplifiers with a second resistive element connected between said input and the output of said one operational amplifier, the other of said two operational amplifiers having a third resistive element connected between the input and output of said other operational amplifier, any of said first, second and third resistive elements being variable for providing said one variable circuit parameter.

19. A circuit in accordance with claim 12 wherein said second current determining means includes at least one variable resistive element for providing said one variable circuit parameter.

* * * * *